United States Patent [19]

Laur

[11] 3,996,188

[45] Dec. 7, 1976

[54] FLAME-RETARDANT SILICONE COMPOSITIONS

[75] Inventor: Thomas L. Laur, Sanford, Mich.

[73] Assignee: Dow Corning Corporation, Midland, Mich.

[22] Filed: Dec. 3, 1975

[21] Appl. No.: 637,244

[52] U.S. Cl. .................. 260/37 SB; 260/45.85 R; 260/45.85 T
[51] Int. Cl.² ......................................... C08L 83/04
[58] Field of Search ............... 260/37 SB, 45.85 R, 260/45.85 T

[56] References Cited
UNITED STATES PATENTS

| | | | |
|---|---|---|---|
| 3,839,266 | 10/1974 | Bargain | 260/37 SB |
| 3,839,280 | 10/1974 | Zdaniewski | 260/37 SB X |
| 3,936,476 | 2/1976 | Itoh et al. | 260/37 SB |

Primary Examiner—Lewis T. Jacobs
Attorney, Agent, or Firm—Roger H. Borrousch; George A. Grindahl

[57] ABSTRACT

An aromatic acid is mixed with a flame-retardant silicone elastomer composition to further increase the flame retardancy of the composition. For example, a flame-retardant silicone composition comprising a polydiorganosiloxane gum, a reinforcing silica filler, a platinum-containing material, a flame-retardant additive such as titanium dioxide, an alcohol-producing organic peroxide such as 2,5-bis(tertiary butyl peroxy)-2,5-dimethylhexane and an aromatic acid such as 2,4-dichlorobenzoic acid has better flame retardancy in the cured state than does a similar composition having no aromatic acid added.

18 Claims, No Drawings

3,996,188

FLAME-RETARDANT SILICONE COMPOSITIONS

BACKGROUND OF THE INVENTION

1. Field of the Invention

This invention relates to silicone elastomer compositions having improved flame retardance.

2. Description of the Prior Art

The need for flame-retardant silicone elastomer compositions has been partially met by certain compositions of the art. Noble, et al., U.S. Pat. No. 3,514,424 teaches a composition of matter which in a cured state exhibits improved flame-retardant properties comprising an organopolysiloxane gum, a finely divided, non-alkaline inorganic filler and a small but effective amount to impart flame retardancy of a platinum-containing material. Up to ⅔ of the total silica filler can be replaced by such materials as carbon black, titanium dioxide or diatomaceous earth or a combination of these materials. Harder, U.S. Pat. No. 3,652,488 teaches a flameresistant composition consisting essentially of a polydiorganosiloxane gum, a reinforcing silica filler, an organic peroxide, an unsupported platinum-containing material and from 0.05 to 2 parts by weight of carbon black being essentially free of sulfur. Laur, et al., U.S. Pat. No. 3,635,874 shows a flame-resistant silicone composition consisting essentially of a polydiorganosiloxane gum, an organic peroxide, an unsupported platinum-containing material, from 0 to 100 parts of a reinforcing silica filler and from 0.5 to 100 parts of a fume titanium dioxide having an average particle diameter of less than 0.10 micron. Pfeifer, et al., U.S. Pat. No. 3,711,520 discloses a composition of matter which in the cured state exhibits improved flame-retardant properties comprising an organosiloxane gum, a finely divided, non-alkaline inorganic filler, a platinum-containing material and a small but effective amount to improve flame retardancy of the above composition of a Group II metal oxide not to exceed 100 parts by weight based on the organopolysiloxane gum. Up to ⅔ of the total silica filler can be replaced by such materials as carbon black, titanium dioxide or diatomaceous earth or a combination of these materials. Milbert, U.S. Pat. No. 3,821,140 provides an organopolysiloxane composition curable on heating to an elastomer comprising at least one diorganopolysiloxane rubber, at least one inorganic filler selected from the group consisting of pyrogenic silica, precipitated silica, reinforcing carbon black, diatomaceous silica, ground quartz, iron oxide, titanium dioxide, and calcium carbonate, an organic peroxide, a compound of platinum and either 3 to 35 parts in total of at least one rare earth metal oxide or 1 to 8 parts in total of at least one rare earth metal hydroxide.

Increasingly stringent safety concerns have made it desirable to have silicone compositions which provide better flame retardance than what is presently available from certain compositions of the art. For example, the peroxide of choice for curing silicone compositions is often, for various reasons, 2,5-bis(tertiary butyl peroxy)-2,5-dimethylhexane, which gives a cured silicone elastomer with relatively poor flame retardance. It would be desirable to provide a more flame-retardant silicone composition that has been cured with 2,5-bis(-tertiary butyl peroxy)-2,5-dimethylhexane.

SUMMARY OF THE INVENTION

It is one object of the present invention to provide organic-peroxide-curable silicone compositions which, in the cured state, have improved flame retardance.

It is another object of this invention to provide silicone rubber compositions, which, when cured with 2,5-bis(tertiary butyl peroxy)-2,5-dimethylhexane, have improved flame retardance.

These and other objects are obtained by admixing a small amount of certain aromatic acids with compositions consisting essentially of a polydiorganosiloxane gum, a reinforcing silica filler, and alcohol-producing organic peroxide, a platinum-containing component and an additive selected from carbon black, titanium dioxide, Group II metal oxides, rare earth metal oxides and rare earth metal hydroxides.

It has been observed that current flame-retardant silicone elastomeric compositions which have been cured with an organic peroxide display a flame retardance which varies with the particular organic peroxide that has been used to cure the composition. For example, Laur, et al. and Harder show that platinum-containing compositions that have been cured with 2,5-bis(tertiary butyl peroxy)-2,5-dimethylhexane have poor flame retardance relative to the same platinum-containing compositions that have been cured with other peroxides such as 2,4-dichlorobenzoyl peroxide, benzoyl peroxide and dicumyl peroxide. It was completely unexpected, however, to find that the flame retardance of a cured silicone composition that has been cured with an alcohol-producing organic peroxide can be improved by admixing a small amount of an aromatic acid selected from the group consisting of mononuclear aromatic acids and halogenated mononuclear aromatic acids, with the silicone composition to be cured.

DESCRIPTION OF THE INVENTION

The present invention relates to a silicone composition consisting essentially of (a) 100 parts by weight of a polydiorganosiloxane gum free of siliconbonded hydrogen atoms wherein each organic radical is selected from the group consisting of methyl, vinyl, 3,3,3-trifluoropropyl and phenyl, there being up to 2.0 percent vinyl radicals, up to 50 percent 3,3,3-trifluoropropyl radicals and up to 10 percent phenyl radicals based on the total number of organic radicals in the polydiorganosiloxane gum and from 1.98 to 2.002 organic radicals per silicon atom in the polydiorganosiloxane gum, (b) from 10 to 100 parts by weight of a reinforcing silica filler, (c) from 0.1 to 10 parts by weight of an alcohol-producing organic peroxide, (d) from 10 to 150 parts by weight per one million parts by weight of the polydiorganosiloxane gum, of platinum as an unsupported platinum-containing material, (e) an effective amount of at least one additive selected from the group consisting of titanium dioxide, carbon black, Group II metal oxides, rare earth metal oxides and rare earth metal hydroxides, and (f) from 0.01 to 1.0 parts by weight of an aromatic acid selected from the group consisting of mononuclear aromatic acids and halogenated mononuclear aromatic acids.

The silicone compositions of the present invention can be any silicone elastomer stock based on a polydiorganosiloxane gum which is free of siliconbonded hydrogen atoms and which contains organic radicals selected from the group consisting of methyl, vinyl, 3,3,3-trifluoropropyl and phenyl, said organic radicals being bonded to the silicon atoms of the polydiorganosiloxane gum. The polydiorganosiloxane gums are well known in the art and can be obtained commercially. Examples of polydiorganosiloxane gums are those polymers, copolymers, and mixtures thereof wherein the repeating units are represented by dimethylsiloxane, phenylmethylsiloxane, methyl-3,3,3-trifluoropropylsiloxane, diphenylsiloxane, methylvinylsiloxane and phenylvinylsiloxane units. The polydiorganosiloxane gums can contain 3,3,3-trifluoropropyl radicals up to 50 percent of the total number of organic radicals vinyl radicals up to 2.0 percent of the total number of organic radicals, preferably up to 1 percent, and phenyl radicals up to 10 percent of the total number of organic radicals, preferably up to 5 percent. The polydiorganosiloxane gums have an average of 1.98 to 2.002 silicon bonded organic radicals per silicon atom. The terminating units can be triorganosiloxy units, hydroxyl groups or alkoxy groups. The triorganosiloxy units can be illustrated by trimethylsiloxy, dimethylvinylsiloxy, methylphenylvinylsiloxy, methyldiphenylsiloxy, dimethyl-3,3,3-trifluoropropylsiloxy, and the like.

The silicone compositions of the present invention can contain any of the conventional reinforcing silica fillers. These reinforcing silica fillers are well known in the art and can be obtained commercially. The reinforcing silica fillers can be untreated, treated or treated in situ. The treated reinforcing silica fillers can be treated by any of the conventional methods described in the prior art, wherein the treating agents include, organosilanes, organosiloxanes, and silazanes. The amount of reinforcing silica filler can be from 10 to 100 parts by weight per 100 parts by weight of the polydiorganosiloxane gum, preferably from 20 to 80 parts by weight reinforcing silica filler.

The platinum is present in an amount of from 10 to 150 parts by weight per one million parts by weight polydiorganosiloxane gum. The preferred amount of platinum is from 20 to 80 parts by weight per one million parts by weight polydiorganosiloxane gum. The platinum can be added in any unsupported form that will permit essentially homogeneous dispersion. A supported form of platinum is platinum metal precipitated on a substrate such as silica, carbon or alumina. Therefore, platinum in an unsupported form is any plantinum-containing material which is not platinum metal precipitated on a substrate. Included in the platinum-containing materials are the readily dispersible platinum compounds and complexes which are well known in the art. Illustrative of the readily dispersible platinum-containing materials that are operable in the composition of this invention are the platinum-containing materials described by Laur, et al. in U.S. Pat. No. 3,635,874 which is hereby incorporated by reference to show the readily dispersible platinum-containing materials and methods for admixing said materials.

A preferred form of platinum is chloroplatinic acid, either as $H_2PtCl_6.6H_2O$ as described by Speier in U.S. Pat. No. 2,823,218, or as a complex with certain organosilicon compounds as described by Willing in U.S. Pat. No. 3,419,593, which is hereby incorporated by reference to show said complex and its use in the art.

The silicone compositions of the present invention also comprise certain additives that are known in the silicone rubber art to provide improve flame retardance to silicone rubber when used with the aforementioned platinum component. One flame-retardant additive is sulfur-free carbon black described in U.S. Pat. No. 3,652,488 to Harder. By the term sulfur-free it is meant that the carbon black contains either no sulfur or very low amounts of sulfur. However, compositions of this invention containing any of the carbon blacks which are available commercially or equivalents thereof have improved flame retardance. Such carbon blacks can be illustrated by lamp black, furnace black, bone black, acetylene black and the like. An effective amount of carbon black for the compositions of the invention is an amount from 0.05 to 2.0 parts by weight per 100 parts by weight of the polydiorganosiloxane gum. A second flame-retardant additive is fume titanium dioxide described in U.S. Pat. No. 3,635,874 to Laur, et al. Fume titanium dioxide is commercially prepared by flame hydrolysis of titanium tetrachloride. Pigment grade titanium dioxide can also be used in the compositions of this invention. An effective amount of titanium dioxide for the compositions of this invention is an amount of from 0.5 to 100 parts by weight per 100 parts by weight of the polydiorganosiloxane gum. Preferably the titanium dioxide is added in amounts of from 2 to 25 parts by weight per 100 parts by weight of the polydiorganosiloxane gum. A third flame-retardant additive is any of the Group II metal oxides described in U.S. Pat. No. 3,711,520 to Pfeifer, et al. The Group II metal oxides which may be employed in the practice of the present invention include beryllium oxide, magnesium oxide, calcium oxide, strontium oxide, barium oxide, zinc oxide. An effective amount of a Group II metal oxide will depend upon the particular oxide that is used and will vary from 0.1 to 100 parts per 100 parts of polydiorganosiloxane gum.

A fourth flame-retardant additive is any of the rare earth metal oxides or rare earth metal hydroxides described in U.S. Pat. No. 3,821,140 to Milbert. When using rare earth metal oxides, it is possible to use either mixtures of rare earth oxides, or the oxides of one well-defined metal, such as those of cerium $CeO_2$, of lanthanum $La_2O_3$, of praseodymium $Pr_6O_{11}$ or of neodymium $Nd_2O_3$ or of samarium $Sm_2O_3$.

Ceric hydroxide, cerous hydroxide, lanthanum hydroxide, neodymium hydroxide, praseodymium hydroxide and samarium hydroxide are examples of rare earth metal hydroxides which can be used separately or as a mixture.

It is known that the composition of rare earth metal hydroxides has not been completely elucidated hitherto. By this term, there are to be understood substances, the empirical formula of which contains essentially oxygen, a rare earth metal and hydrogen bonded to an oxygen atom. These OH units can either be bonded directly to the metal atom or they can form part of combined water molecules, or they can be present in both forms.

The rare earth metal oxide is employed at the rate of 3 to 35 parts, and preferably 5 to 25 parts, per 100 parts of polydiorganosiloxane gum. The rare earth metal hydroxides are present in from 0.5 to 8 parts by weight, preferably 2 to 6, per 100 parts by weight of polydiorganosiloxane gum.

The compositions of this invention can contain an effective amount of any one or any mixture of the additives selected from the group consisting of titanium dioxide, carbon black, Group II metal oxides, rare earth metal oxides and rare earth metal hydroxides. For maximum fire retardancy, the compositions of this invention should comprise a mixture of fume titanium dioxide, sulfur-free carbon black and a rare earth metal hydroxide, but it is to be understood that the compositions of this invention comprising an aromatic acid, hereinafter described, and having been cured with an alcohol-producing organic peroxide, have improved flame retardancy relative to the same compositions containing no aromatic acid regardless of what additive or combination of additives, hereinbefore described, is used.

The compositions of this invention comprise an alcohol-producing organic peroxide as a curing agent. The preferred alcohol-producing organic peroxide curing agents for the compositions of this present invention are the alcohol-producing organic peroxides that are well known in the silicone rubber art. An alcohol-producing organic peroxide is a peroxide which, when used to produce free radicals, produces an alcohol such as tertiary butyl alcohol, as a by-product. Some illustrative examples of alcohol-producing organic peroxides that are suitable for use in the compositions of this invention include 2,5-bis(tertiary butyl peroxy)-2,5-dimethylhexane, dicumyl peroxide, di-tertiary butyl peroxide and a tertiary butyl peroxy isopropyl carbonate. The organic peroxides can be present in amounts of from 0.1 to 10 parts by weight per 100 parts by weight of the polydiorganosiloxane gum, preferably from 0.3 to 3.0 parts by weight.

The critical component of the compositions of this invention which unexpectedly provides an increased flame retardance for the cured composition, especially those compositions which have been cured with 2,5-bis(tertiary butyl peroxy)-2,5-dimethylhexane, is an aromatic acid. An aromatic acid for the purposes of this invention is any of the mononuclear or halogenated mononuclear carboxylic acids having a single benzene ring (mononuclear) or a single halogenated benzene ring (halogenated mononuclear) with at least one carboxyl radical bonded directly thereto through a carboncarbon bond. Examples of an aromatic acid are monocarboxylic acids such as benzoic acid; monohalobenzoic acid such as para-chlorobenzoic acid, meta-bromobenzoic acid, fluorobenzoic acid; dihalobenzoic acid such as dichlorobenzoic acid such as 2,3-dichlorobenzoic acid, 2,4-dichlorobenzoic acid, 2,5-dichlorobenzoic acid, 3,4-dichlorobenzoic acid, bromochlorobenzoic acid; trihalobenzoic acid such as 2,4,5-trichlorobenzoic acid; dicarboxylic acid such as phthalic acid, isophthalic acid, terphthalic acid; halogenated dicarboxylic acids such as bromophthalic acid, 3,5-dichlorophthalic acid and 4,6-dichloroisophthalic acid. It is preferred that the aromatic acid be benzoic acid or dichlorobenzoic acid such as 2,4-dichlorobenzoic acid. It is surprising that an aromatic acid such as dichlorobenzoic acid is an effective flame-retarding component in a silicone composition curable with an alcohol-producing organic peroxide since the presence of an equivalent amount of dichlorobenzene in place of the dichlorobenzoic acid in the compositions of this invention does not reduce the burn time of the cured silicone elastomer.

The amount of aromatic acid that is used in the compositions of this invention is from 0.01 to 1.0 parts by weight for every 100 parts by weight of polydiorganosiloxane gum (a). While it is not completely understood why the compositions of this invention have improved flame retardance, it is believed that the aromatic acid combines with the alcohol from the decomposed organic peroxide to produce, when the composition is cured, a composition that does not burn and/or glow readily. The optimum amount of aromatic acid, within the limits hereinbefore stated, will depend upon the particular type and amount of peroxide used, the particular aromatic acid used and particular cure conditions that are used for a composition of this invention. For example, an aromatic acid that is eminently suitable for a composition that is to be press cured only may not be the aromatic acid of choice for a composition that is to be post cured in the wellknown manner after being press cured. Also, the optimum amount of a monocarboxylic aromatic acid may not be the same as the optimum amount of a dicarboxylic aromatic acid. The practioner of this invention is advised to determine the optimum amount of an aromatic acid to be admixed into a silicone composition by simple experimentation. For compositions to be cured with 2,5-bis(tertiary butyl peroxy)-2,5-dimethylhexane a preferred amount of 2,4-dichlorobenzoic acid to admix to said composition is from 0.05 to 0.7 parts by weight for every 100 parts by weight of polydiorganosiloxane gum (a).

The aromatic acid can be admixed in its pure form, or as a mixture with an inert solid such as silica or as a mixture or a solution with an organic or a silicone diluent or carrier fluid. It is to be understood that the aromatic acid can also be admixed in a precursor form which, under the conditions of mixing, for example, in the presence of water, will be converted into the aromatic acid. Suitable precursor forms include anhydrides such as benzoic anhydride and acyl halides such as 2,4-dichlorobenzoyl chloride. A convenient way to add the small amounts of aromatic acid that are effective in the compositions of this invention is to prepare a solution of the acid or a suitable precursor in a polydiorganosiloxane fluid or gum and add the resulting solution of known concentration to the composition.

The compositions of this invention are prepared by any suitable mixing method that will lead to a homogeneous mixture of the several components. Methods of mixing that are common in the silicone rubber art and which are suitable for this invention include mixing with a dough mixer or with a rubber compounding mill. Organic solvents such as xylene may be used to facilitate mixing if desired; said solvents, if any, being removed before the compositions of this invention are cured.

The order of mixing of the components of these compositions is not critical. Heating may be used to facilitate mixing; however, any mixture containing the organic peroxide should not be heated so hot as to cause appreciable curing of the composition until said curing is desired. A convenient way to prepare the compositions of this invention is to admix the appropriate amounts of the reinforcing silica filler and the additives selected from the group consisting of carbon black, titanium dioxide, Group II metal oxides, rare earth metal oxides and rare earth metal hydroxides, to the polydiorganosiloxane gum in a mixer, using heat to facilitate the mixing process and then add the appropriate amounts of the platinum-containing material, the organic peroxide and the aromatic acid to the cooled mixture of gum, filler and additive.

The flame-retardant silicone compositions of the present invention can include other fillers such as finely divided quartz, clays, calcium carbonate, diatomaceous earth, iron oxide and others which are conventionally used in silicone elastomers. Other additives such as heat stability additives, antioxidants, processing aids and other additives conventionally used in silicone elastomers can be used in the flame-retardant silicone elastomer stock of this invention. Those skilled in the art of silicone rubber wanting to include some of the conventional ingredients other than those specifically stated in the composition should determine the flame retardancy of the stock by the test described herein. Some ingredients may be sufficiently combustible to destroy the flame-retardant property or they may be catalytic in nature and promote combustion, thereby destroying the flame-retardant property.

These additional additives, if any, that are common in the silicone rubber art can be admixed at any appropriate time with the compositions of this invention.

The curable homogeneous compositions of this invention can be cured by any suitable means that will cause decomposition of the alcohol-producing organic peroxide to produce free radicals. Heating is the preferred means of curing said compositions. Said composition is formed into the desired shape and heated to an appropriate temperature to decompose the organic peroxide. The curing temperature that is the appropriate temperature for any particular organic peroxide is well known in the silicone rubber art.

The compositions of this invention are useful for making elastomeric articles such as aircraft parts and electrical cable coatings that have improved flame retardance and improved safety. Flame retardancy is measured according to the 12 second flame test described in Example 1.

The following examples are included for illustrative purposes only and should not be construed as limiting the invention which is properly delineated by the appended claims. All parts are parts by weight.

EXAMPLE 1

A silicone elastomer stock was prepared by milling a mixture of 100 parts of a polydiorganosiloxane gum having, as a percentage of all organic radicals in the gum, 98.837 percent methyl radicals, 0.368 percent vinyl radicals and 0.795 percent phenyl radicals, 48.78 parts of a treated reinforcing silica filler, 7.33 parts of a fume titanium dioxide, 7.33 parts of a 5 micron quartz filler, 2.20 parts of ceric hydrate and 33 parts Pt, per one million parts of the polydiorganosiloxane gum, as a 6 percent by weight solution of $H_2PtCl_6.6H_2O$ in isopropyl alcohol. One hundred parts of the silicone elastomer stock was mixed with an appropriate amount of the organic peroxide curing agent and the aromatic acid indicated in Table I. The silicone elastomer stocks containing organic peroxide curing agent and aromatic acid, if any, were press molded at the conditions appropriate for the organic peroxide that was used as the curing agent. Some of the press molded samples were given a post cure at 163° C. for 4 hours. The test specimens were prepared, conditioned at 50 percent relative humidity for 24 hours at room temperature and tested for flame retardance as follows. A 2.0 ± .1 mm thick specimen was exposed to an open yellow flame 3.8 cm. in height from a 9.5 mm I. D. Bunsen burner. The end of the test specimen was held 1.9 cm from the top of the burner for 12 seconds. The test specimen was then removed from the flame and the burn time was observed. The burn time was recorded as the length of time, in seconds, between the removal of the test specimen from the flame to the last evidence of flame and glow of the test specimen. The char length was measured and recorded in millimeters. The results are summarized in Table I.

TABLE I

| Test Specimen Number | Organic Peroxide[1] parts | Aromatic Acid[2] | parts | Flame Retardance Test | | | |
|---|---|---|---|---|---|---|---|
| | | | | Press Cure[1] | | Post Cure | |
| | | | | Burn Sec. | Char mm. | Burn Sec. | Char mm. |
| 1 a | A | 0.8 | — | — | 32 | — | 20 | — |
| 1 b | A | 0.8 | DCBA | 0.2 | 27 | — | 12 | — |
| 2 a | B | 0.3 | — | — | 46 | 12.7 | 19.3 | 1.6 |
| 2 b | B | 0.3 | DCBA | 0.8 | 13.6 | 6.4 | 12 | 1.6 |
| 3 a | B | 0.3 | — | — | 38.3 | 12.7 | 39 | 12.7 |
| 3 b | B | 0.3 | DCBA | 0.1 | 7.6 | 1.6 | 14.3 | 1.6 |
| 3 c | B | 0.3 | DCBA | 0.2 | 13 | 1.6 | 12.3 | 1.6 |
| 3 d | B | 0.3 | DCBA | 0.4 | 11.6 | 1.6 | 18 | 3.2 |
| 3 e | B | 0.3 | DCBA | 0.6 | 13 | 3.2 | 9 | 1.6 |
| 3 f | B | 0.3 | DCBA | 0.8 | 13 | 3.2 | 37 | 12.7 |
| 4 a | B | 0.3 | — | — | 66 | 19.0 | 32 | 6.4 |
| 4 b | B | 0.3 | DCBA | 0.05 | 32 | 9.5 | 10 | 3.2 |
| 4 c | B | 0.3 | DCBA | 0.1 | 11 | 1.6 | 9 | 1.6 |
| 4 d | B | 0.3 | DCBA | 0.15 | 14 | 3.2 | 12 | 3.2 |
| 4 e | B | 0.3 | DCBA | 0.2 | 12 | 3.2 | 5 | 1.6 |
| 5 a | B | 0.3 | — | — | 51.6 | 12.7 | 29 | 5.1 |
| 5 b | B | 0.3 | BA | 0.05 | 36 | 7.6 | 28 | 6.4 |
| 5 c | B | 0.3 | BA | 0.25 | 17.3 | 3.2 | 35.3 | 7.6 |
| 5 d | B | 0.3 | BA | 0.5 | 30.3 | 10.2 | 37 | 7.6 |

[1]A Dicumyl peroxide - Press cure 10 min. at 150° C. B 2,5-Bis(tertiary butyl peroxy)-2,5-dimethylhexane - Press cure 10 min. at 171° C.
[2]DCBA 2,4-dichlorobenzoic acid BA Benzoic acid Aromatic acid added as a 1:1 mixture by weight in polydiorganosiloxane gum in Test specimen 3 series, 4 series, and 5 series.

EXAMPLE 2

A silicone elastomer stock was prepared by milling a mixture of 100 parts of a polydiorganosiloxane gum having, as a percentage of all organic radicals in the gum, 99.921 percent methyl radicals, 0.077 percent vinyl radicals and 0.001 percent hydroxy radicals, 63.80 parts of a treated reinforcing silica filler, 1.78 parts of sulfur-free carbon black, 8.92 parts of fume titanium dioxide, 16.36 parts of magnesium oxide, 8.92 parts of 5 micron quartz, 0.45 parts of 2,5-bis(tertiary butyl peroxy)-2,5-dimethylhexane and 15.5 parts of platinum, as a complex of $H_2PtCl_6.6H_2O$ with sym-divinyltetramethyldisiloxane, per one million parts of polydiorganosiloxane gum. One hundred parts of the silicone elastomer stock was mixed with 0.4 parts of a 1:1 mixture of 2,4-dichlorobenzoic acid in polydiorganosiloxane gum. The resulting mixture containing 2,4-dichlorobenzoic acid was press cured at 171° C. for 10 minutes. Two samples of the press cured sample were tested for flame retardancy as described in Example 1 and were found to have burn times of 7 seconds and 10 seconds respectively. Two samples of the press cured stock having no 2,4-dichlorobenzoic acid had burn times of 40 seconds and 98 seconds respectively.

EXAMPLE 3

One hundred parts of the silicone elastomer stock of Example 1 was mixed with 0.5 parts of sulfurfree carbon black, 0.6 parts of a 1:1 mixture of 2,5-bis(tertiary butyl peroxy)-2,5-dimethylhexane and an inert powder and 0.4 parts of a 1:1 mixture of 2,4-dichlorobenzoic acid and a polydiorganosiloxane gum having 99.901 percent methyl radicals and 0.099 percent vinyl radicals. When tested according to the flame retardancy test described in Example 1 this composition had a 5 second burn time after a press cure of 10 minutes at 171° C. and a 2 second burn time after a post cure of 4 hours at 163° C. See test specimen Nos. 2a, 3a, 4a, and 5a of Table I for comparative samples without carbon black and 2,4-dichlorobenzoic acid. See Test specimen Nos. 3c and 4e of Table I for comparative samples without carbon black.

EXAMPLE 4

A silicone elastomer stock was prepared by milling a mixture of 100 parts of a polydiorganosiloxane gum having 99.648 percent methyl radicals and 0.352 percent vinyl radicals, 49.50 parts of a treated reinforcing silica filler, 7.48 parts of 5 micron quartz filler, 1.50 parts of a 1:1 mixture of 2,5-bis(tertiary butyl peroxy)-2,5-dimethylhexane and an inert powder and 35 parts, per 1 million parts of the polydiorganosiloxane gum, of platinum, as a 6 percent by weight solution of $H_2PtCl_6.6H_2O$ in isopropyl alcohol. Specimens were prepared by mixing one hundered parts of this silicone elastomer with the components indicated in the Table II and the several mixtures were press cured at 171° C. for 10 minutes and post cured at 150° C. for 4 hours. After being exposed to an atmosphere of 50 percent relative humidity at 25° C. for 24 hours the test specimens were subjected to the fire retardancy test described in Example 1. Carbon black was added as a 1:1 weight mixture of P-33 carbon black with a polydimethylsiloxane gum. 2,4-Dichlorobenzoic acid was added as a 1:1 weight mixture with a polydimethylsiloxane gum. This example shows the flammability of a silicone elastomer stock that has been cured with 2,5-bis(tertiary butyl peroxy)-2,5-dimethylhexane and the effectiveness of 2,4-dichlorobenzoic acid in combination with sulfur-free carbon black and/or fume titanium dioxide as a flame retardancy additive in said silicone elastomer stock.

EXAMPLE 5

When the 100 parts of polydiorganosiloxane gum in the silicone elastomer stock of Example 2 is replaced with 100 parts of a polydiorganosiloxane gum having approximately 50 percent methyl radicals and 50 percent 3,3,3-trifluoropropyl radicals, based on the total number of organic radicals in the gum, a stock having improved flame retardancy, relative to the same stock without the 2,4-dichlorobenzoic acid, is obtained.

That which is claimed is:
1. A silicone composition consisting essentially of:
   a. 100 parts by weight of a polydiorganosiloxane gum, free of silicon-bonded hydrogen atoms, wherein each organic radical is selected from the group consisting of methyl, vinyl, 3,3,3-trifluoropropyl and phenyl, there being up to 2.0 percent vinyl radicals, up to 50 percent 3,3,3-trifluoropropyl radicals and up to 10 percent phenyl radicals based on the total number of organic radicals in the polydiorganosiloxane gum and from 1.98 to 2.002 organic radicals per silicon atom in the polydiorganosiloxane gum,
   b. from 10 to 100 parts by weight of a reinforcing silica filler,
   c. from 0.1 to 10 parts by weight of an alcoholproducing organic peroxide,
   d. from 10 to 150 parts by weight per one million parts by weight of the polydiorganosiloxane gum of platinum as an unsupported platinum-containing material,
   e. an effective amount of at least one additive selected from the group consisting of titanium dioxide, carbon black, Group II metal oxides, rare earth metal oxides and rare earth metal hydroxides, and
   f. from 0.01 to 1.0 parts by weight of an aromatic acid selected from the group consisting of mononuclear aromatic acids and halogenated mononuclear aromatic acids.

2. The composition according to claim 1 wherein the aromatic acid is selected from the group consisting of dichlorobenzoic acid and benzoic acid.

3. The composition according to claim 2 wherein the alcohol-producing organic peroxide is 2,5-bis(tertiary butyl peroxy)-2,5-dimethylhexane.

4. The composition according to claim 3 wherein the reinforcing silica filler is present in an amount of from 20 to 80 parts by weight, the organic peroxide is present in an amount of from 0.3 to 3.0 parts by weight, the platinum is present in an amount of from 20 to 80 parts by weight per one million parts by weight of the polydiorganosiloxane gum and is present in the form of chloroplatinic acid, the aromatic acid is 2,4-dichlorobenzoic acid and is present in an amount of from 0.05 to 0.7 parts and the additive is at least one of fume titanium dioxide and sulfur-free carbon black.

TABLE II

| Fire Retardant Additive | Burn Time - Seconds | | | |
|---|---|---|---|---|
| | No 2,4-dichlorobenzoic acid mixture | | 0.75 parts of 2,4-dichlorobenzoic acid mixture | |
| | Press Cure | Post Cure | Press Cure | Post Cure |
| 1.4 parts Carbon Black Mixture | Burned | Burned | 44.6 | 17.6 |
| 4.7 parts Fume $TiO_2$ | Burned | Burned | 86.0 | 110.0 |
| 1.4 parts Carbon Black Mixture + 4.7 parts Fume $TiO_2$ | Burned | Burned | 13.6 | 10.3 |
| None | Burned | Burned | Burned | Burned |

5. The composition obtained by curing the composition of claim 1.

6. The composition obtained by curing the composition of claim 4.

7. A process of preparing a silicone composition having improved flame retardance in the cured form comprising mixing
   a. 100 parts by weight of a polydiorganosiloxane gum, free of silicon-bonded hydrogen atoms, wherein each organic radical is selected from the group consisting of methyl, vinyl, 3,3,3-trifluoropropyl and phenyl, there being up to 2.0 percent vinyl radicals, up to 50 percent 3,3,3-trifluoropropyl radicals and up to 10 percent phenyl radicals based on the total number of organic radicals in the polydiorganosiloxane gum and from 1.98 to 2.002 organic radicals per silicon atom in the polydiorganosiloxane gum,
   b. from 10 to 100 parts by weight of a reinforcing silica filler,
   c. from 0.1 to 10 parts by weight of an alcohol-producing organic peroxide,
   d. from 10 to 150 parts by weight platinum per one million parts by weight of the polydiorganosiloxane gum, said platinum being in the form of a platinum-containing material in an unsupported form,
   e. an effective amount of an additive selected from the group consisting of titanium dioxide, carbon black, Group II metal oxides, rare earth metal oxides, and rare earth metal hydroxides, and
   f. from 0.01 to 1.0 parts by weight of an aromatic acid selected from the group consisting of mononuclear aromatic acids and halogenated mononuclear aromatic acids to produce a curable homogeneous mixture.

8. The process in accordance with claim 7 wherein the aromatic acid is selected from the group consisting of dichlorobenzoic acid and benzoic acid.

9. The process in accordance with claim 8 wherein the alcohol-producing organic peroxide is 2,5-bis(tertiary butyl peroxy)-2,5-dimethylhexane.

10. The process in accordance with claim 9 wherein the reinforcing silica is present in an amount of from 20 to 80 parts by weight, the organic peroxide is present in an amount of from 0.3 to 3.0 parts by weight and the platinum is present in an amount of from 20 to 80 parts by weight per 1 million parts by weight of the polydiorganosiloxane gum and is mixed in the form of chloroplatinic acid, the aromatic acid is 2,4-dichlorobenzoic acid and is present in an amount of from 0.05 to 0.7 parts and the additive is at least one of fume titanium dioxide and sulfur-free carbon black.

11. The curable homogeneous mixture obtained in accordance with the method of claim 7.

12. The curable homogeneous mixture obtained in accordance with the method of claim 10.

13. The process in accordance with claim 7 further characterized by heating the curable homogeneous mixture to prepare a cured silicone elastomeric composition having improved flame retardance.

14. The process in accordance with claim 8 further characterized by heating the curable homogeneous mixture to prepare a cured silicone elastomeric composition having improved flame retardance.

15. The process in accordance with claim 9 further characterized by heating the curable homogeneous mixture to prepare a cured silicone elastomeric composition having improved flame retardance.

16. The process in accordance with claim 10 further characterized by heating the curable homogeneous mixture to prepare a cured silicone elastomeric composition having improved flame retardance.

17. The cured silicone elastomeric composition having improved flame retardance obtained in accordance with the process of claim 13.

18. The cured silicone elastomeric composition having improved flame retardance obtained in accordance with the process of claim 16.

* * * * *

UNITED STATES PATENT AND TRADEMARK OFFICE
CERTIFICATE OF CORRECTION

PATENT NO. : 3,996,188
DATED : December 7, 1976
INVENTOR(S) : Thomas L. Laur

It is certified that error appears in the above-identified patent and that said Letters Patent are hereby corrected as shown below:

In Column 1, line 22; the line reading "teaches a flameresistant composition consisting essen-" should read "teaches a flame-resistant composition consisting essen-"

In Column 8, line 62; the line reading "platinum, as a complex of $H_2PtCl_6 \cdot 6H_2O$ with sym" should read "platinum, as a complex of $H_2PtCl_6 \cdot 6H_2O$ with sym"

In Column 10, line 26; the line reading "c. from 0.1 to 10 parts by weight of an alcoholpro-" should read "c. from 0.1 to 10 parts by weight of an alcohol-pro-"

Signed and Sealed this

Twenty-sixth Day of January 1982

[SEAL]

Attest:

GERALD J. MOSSINGHOFF

Attesting Officer     Commissioner of Patents and Trademarks